United States Patent Office 3,244,975
Patented Apr. 5, 1966

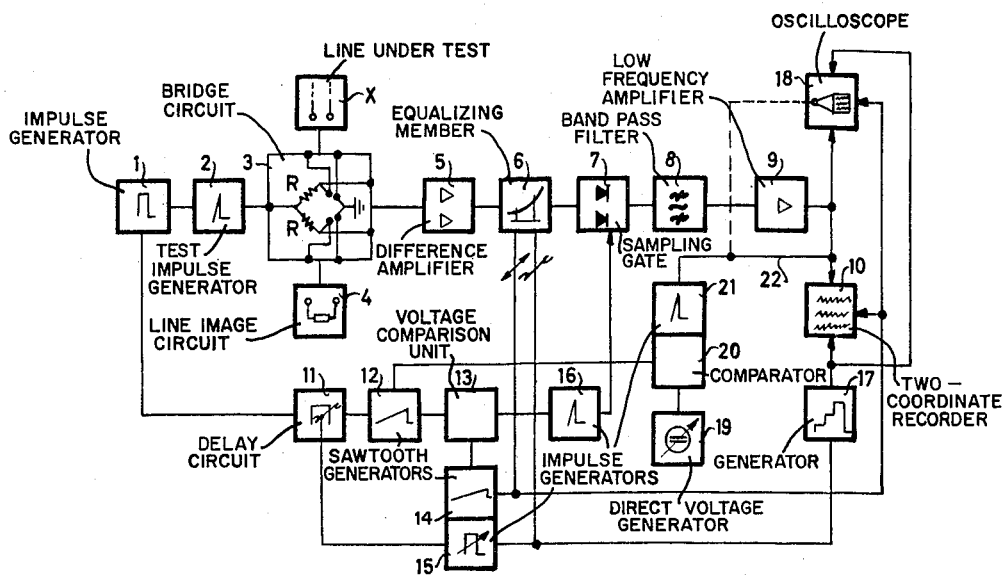

3,244,975
APPARATUS FOR DETERMINING DISTURBANCES ALONG ELECTRICAL LINES UTILIZING THE IMPULSE REFLECTION METHOD INCLUDING ADJUSTABLE EQUALIZING MEANS AND STROBOSCOPIC SAMPLING
Hermann Bauer, Munich, Germany, assignor to Siemens & Halske Aktiengesellschaft, Berlin and Munich, Germany, a corporation of Germany
Filed Sept. 28, 1962, Ser. No. 226,848
Claims priority, application Germany, Dec. 20, 1961, S 77,192
10 Claims. (Cl. 324—52)

The invention disclosed herein relates to an arrangement for determining disturbances along electrical lines and is particularly concerned with an arrangement for determining, according to the impulse reflection method, faults or points of inhomogeneity along electrical lines.

According to the known impulse reflection method, faults or inhomogeneities along a line or a cable are ascertained by supplying at the line input test impulses of appropriate form, such impulses running through the line and causing appearance, at the plurality of fault points, of reflection pulses, hereinafter referred to as reflection voltages, which are received and evaluated at the input of the corresponding line. The magnitude of the reflection voltages permits conclusions as to the extent of an existing fault while the phase position or running time of the reflection voltages, related to the transmitted test impulses, permits conclusions as to the distance of the respective fault points from the line input. The evaluation is thereby customarily effected with the aid of a cathode ray oscilloscope, the electron beam of which is linearly as to time horizontally deflected synchonously with the transmitted test impulse sequence, the received reflection voltages being conducted to the vertical deflection device of the tube so that they appear upon the screen as deflections from the horizontal time axis. A definite portion of the time axis corresponds thereby to a definite impulse running time and thus to a definite length of the line as measured from the line input.

As is known, the frequency dependent attenuation properties of a line or cable have to be taken into account so as to obtain with the impulse reflection method accurate measurement results. It must be considered in this connection that the strong increase of the line attenuation in the case of higher frequencies produces a stronger attenuation of an impulse, running through the line, in the higher frequencies of the frequency spectrum thereof, thus resulting in a distortion which appears mainly in a rounding out of the impulse flanks and edges. This impulse distortion becomes progressive with the increase of the line lengths covered by the running impulse and it follows, therefore, that faults or inhomogeneity points located farther away from the line input cannot be accurately evaluated without the use of auxiliary compensating measures.

Accordingly, a compensation of the impulse distortion is effected in known measuring apparatus of this kind, by conducting the transmitted test impulses and/or the received reflection voltages, over equalizing members which are as to the frequency response thereof selectively adjustable, so as to obtain as far reaching a correction as possible, of the received reflection voltages, for different and especially possibly for all line length encountered and for all total impulse running times, respectively.

The total impulse running time includes the running time of the test impulse conducted to the line up to reaching the respective fault point and the running time of the reflected voltages formed at the fault point, back to the line input. Amplifiers are used, for example, as equalizing members, such amplifiers being appropriately regulatable as to the degree of gain and frequency response, or else, there are provided passive attenuation quadrupoles with regulatable or selectively connectible circuit elements with respectively appropriately changing frequency characteristics.

It is for the automatic point-wise distortion correction of the reflection image necessary that the equalizing members are respectively regulated or switched depending upon time, the regulation operations being thereby periodically repeated with the sequence frequency of the test impulses.

In the known apparatus for testing cables a reduction of the circuitry expenditure for the distortion correction of the impulses is obtained by subdividing the entire line length into given measuring portions and by setting the equalizing members for the individual measuring portions respectively to a fixed optimum frequency response which is peculiar thereto. However, in the event that all measuring ranges are to be successively automatically evaluated, several switching operations will again be required within a period of the test impulse voltage, for switching the equalizing members successively with respect to the individual measuring ranges.

According to the invention, an arrangement of the initially indicated kind, which includes adjustable equalizing means for compensating impulse distortions, comprises means for conducting the reflection voltages to an evaluation device operating in accordance with a known stroboscopic scanning or sampling method, and means for respectively conducting the stroboscopic time deflection voltage or an impulse voltage which is rigidly in phase therewith, to the adjusting members of the equalizing means, as a control voltage for the continuous or stagewise actuation thereof.

It is known to use stroboscopic sampling for the recording of impulse voltages of high sequence frequency. A momentary value is thereby sampled within each period of the impulse voltage, whereby the momentary values of successive periods are mutually phase shifted by a small amount. Upon recording the individual momentary values, one next to the other, with consideration of the so-called stroboscopic time deflection voltage, there will be obtained a punctiform image of the impulse voltage curve, such image appearing with the low deflection speed of the stroboscopic time deflection and being adapted for tracing by means of a recording device, for example, by means of a sheet recorder.

The use of the stroboscopic sampling in connection with the determination of faults along lines, according to the invention, offers the advantage of direct instrumentation evaluation with relatively great accuracy. The automatically recorded reflection image of the line involved remains preserved after conclusion of the testing or measuring operation, and can be stored, which is not possible in the case of a purely optical representation on the picture screen of a viewing device. The procedure according to the invention also obviates relatively complicated evaluation of the reflection image, as in connection with customary measuring instruments, requiring respectively tracing or photographing of the curve course represented on the picture screen.

Moreover, the arrangement according to the invention makes it possible to carry out an automatic impulse distortion correction while at the same time considerably reducing the circuitry expenditure with respect to the time-controllable equalizing means, as compared with previously known arrangements. This simplification is based upon recognition of the fact that only the distortion of the sampled momentary value of the reflection image need be corrected, in a stroboscopic sampling of time dependng, continuous impulse distortion correction, whereby the respective adjustment of the equalizing means can be retained up to the beginning of the next sampling operation. However, the alteration of the adjustment of the equalizing means is, at such instant, relatively slight, owing to the very slight mutual phase shift between the two successively sampled momentary values with respect to the test impulse voltage period. It follows, therefore, that the adjustment of the equalizing means does not have to satisfy any extreme conditions as to time, such as is the case in connection with customary measuring apparatus, in which the impulse distortion correction must be effected periodically with the sequence frequency of the high frequency test impulses, always for the total reflection image. A corresponding simplification is also obtained with the arrangement according to the invention, in cases requiring impulse equalizing along sections, with distortion correction means which are to be operatively switched stage by stage.

Further features and advantages of the arrangement according to the invention will appear from the description which is rendered below with reference to the accompanying drawing showing a preferred embodiment thereof.

In the drawing, numeral 1 indicates a control impulse generator for the synchronization of a test impulse generator 2 which transmits test impulses of customary shape. The test impulses pass over a bridge circuit 3 to the electrical line X which is to be checked with respect to fault points or points of inhomogeneities, such line X being with the input terminals thereof inserted in a bridge branch, a bridge comparison branch being at the same time formed by a line image circuit 4. The bridge circuit which includes two resistors R operates so that the test impulses are extended to the line X but not to the input of a serially disposed difference amplifier 5, such amplifier being affected only by the reflection voltages formed along the line and asymmetrically delivered at the bridge output. The received reflection voltages are extended from the output of the difference amplifier to an adjustable equalizing member 6 and thence to a sampling gate 7.

A delay circuit (phase shift circuit) 11 is started in operation under the control of the control impulse generator 1, therewith synchronously with the test impulses, which delay circuit 11 causing, with a given adjustable time delay, the operative release of a saw-tooth voltage produced by a sawtooth generator 12. The sawtooth voltage which is thus produced with delay, defines within the period of the test impulse voltage, with the width of the sawtooth, always respectively a shorter time interval or partial reflection image, within which the reflection voltages are to be evaluated. The entire reflection image of the line can be continuously represented and evaluated upon adjustment to a sawtooth width which corresponds to the period duration of the test impulse voltage. The sawtooth voltage produced by the sawtooth generator 12 is conducted to an input of a voltage comparison circuit (comparator) 13, the other input of which is connected with a sawtooth voltage generator 14, the latter sawtooth generator 14 being synchronized by the impulse generator 15 and producing a stroboscopic time deflection voltage. The sequence frequency of the sawtooth generator 14 or frequency of the stroboscopic time deflection voltage, respectively, is by orders of magnitude lower than the sequence frequency of the control impulse generator 1 of the sawtooth generator 12, respectively.

Whenever the rising flank of a sawtooth formed in the generator 12 reaches the momentary value of the time deflection voltage produced in the generator 14, an output impulse will appear in the voltage comparison circuit (comparator) 13, such impulse causing formation of a pin impulse in the serially disposed impulse generator 16. Corresponding to the slowly rising stroboscopic time deflection voltage, these pin impulses lie always at mutually slightly shifted points of the rising flanks of the sawteeth produced at 12 and are therefore from period to period of the reflection voltage always mutually phase shifted by a given small amount. The pin impulses are conducted to the sampling gate 7 which is, for example, constructed as a push-pull modulator gate, and make such circuit conductive for the incoming reflection voltage.

The received reflection voltage is therefore once in each period for a very short instant switched through to the output of the sampling gate 7, according to the time sequence of the individual pin impulses, which sequence is determined by the function of the voltage comparison circuit 13, so that a momentary value can always be sampled. Since the momentary values are in the successive periods mutually slightly phase shifted, there is in a sense effected a punctiform stroboscopic sampling of the reflection voltages, with the relatively low frequency of the stroboscopic time deflection.

The sampled momentary values of the reflection voltages are in a serially disposed integrating band pass filter 8 converted into impulses of considerably greater length, by utilizing the storage effect, such extended impulses practically merging into one another, so that the output voltage of the filter represents in a sense a tracing of the reflection voltage curve, with the low frequency of the stroboscopic time deflection voltage. This output voltage is amplified in the low frequency amplifier 9 and is thereupon conducted to the vertical deflection device of the two-coordinate recorder 10. The horizontal deflection device is thereby affected either in the case of a so-called sheet recorder, by the stroboscopic time deflection voltage produced at 14 or is, in the case of a line recorder, actuated independently of the stroboscopic time deflection voltage, so as to produce a continuous advance transport motion of the recording carrier.

The frequency response of the adjustable equalizing member 6, which is advantageously constructed as an amplifier with regulatable frequency characteristic and regulatable gain, or as an attenuation quadrupole with circuit elements in the longitudinal branch and in the transverse branch, is thereby, for the automatic impulse distortion correction, adjusted to the desired frequency response, by conducting to appropriate adjusting members a regulation or control voltage, respectively.

The stroboscopic time deflection voltage as such, which is produced by the sawtooth generator 14, is preferably used respectively as regulation voltage and as control voltage, in the case of a continuous distortion correction during a continuous recording of the total reflection image. The considerable advantage which thereby results resides in that the periodic adjustment of the equalizing member 6, with full distortion effect, need not be carried out with the frequency of the test impulse voltage, but respectively only with the stroboscopic time deflection voltage which is lower by orders of magnitude, or with the sequence frequency of the impulse generator 15. The time requirements posed with respect to the individual partial circuits of the equalizing member 6 are thereby considerably reduced, and the operating conditions for the switching elements are simplified to such an extent that simple mechanical switches can be used in place of electronic switches, without affecting the functional reliability.

The impulses produced by the impulse generator 15, which synchronize the stroboscopic time deflection voltage, are preferably directly used as control commands for the switching of the adjusting elements at 6, in a case which is as to circuitry simpler, wherein individual measuring length on the line which is to be tested, are determined within the period of the test impulse voltage by the phase position of the sawtooth produced at 12, which measuring lengths are to be successively evaluated, whereby a change in the adjustment of the equalizing member 6 is effected merely from measuring length to measuring length. The delay circuit (phase shift circuit) 11 is so affected by the impulse generator 15, for the simultaneous switching over to the individual measuring length of the reflection image, that the respective synchronization impulses from 15 cause a stepping ahead of the time delay (phase-shift) in the time stages provided for the individual measuring length, as is indicated in the drawing. However, such a switching over from measuring length to measuring length does not exclude additionally carrying out, in given cases, a continuous regulation, within the individual measuring lengths, depending upon the stroboscopic time deflection voltage.

In case it is desired to carry out the automatic recording of the entire reflection image, which had been corrected according to lengths or sections, so that the individual measuring lengths are represented in respective lines, one below the other, the operations required for the line switching can advantageously likewise be derived respectively from the stroboscopic time deflection voltage or from the synchronization impulses upon which it is based. There is for this purpose provided a generator 17 which produces a stepped voltage, whereby the individual steps are switched in, in timing with the synchronizing impulses produced at 15. This stepped voltage is conducted to the vertical deflection device of the two-coordinate recorder 10 and effects the setting to different lines disposed one below the other.

It is in this connection to be considered a distinct advantage that the impulse generator 15 which synchronizes the stroboscopic time deflection voltage required for the stroboscopic sampling, also constitutes a common device which automatically controls in time correct manner the switching operations required for the mutual delimiting of the partial reflection images to be represented in the individual lines, also the switching operations required for the setting to the respective lines. The delimiting of the individual reflection images is thereby effected by controlling the operation of the delay device 11 while the setting to the respective lines is effected by controlling the operation of the generator 17. It shall be observed that the low control frequency likewise permits here the use of very simple control elements, for example, mechanical switches.

A shortening or lengthening of the sawtooth impulses which are respectively allocated to a measuring section or length, can be obtained by appropriately additionally adjusting the time-determining members of the sawtooth generator 12. Upon shortening the sawtooth impulses, the reflection image represented in the corresponding line will embrace only a part of the measuring section, which can be represented as extended over the entire length of the line, while a lengthening of the sawtooth impulses will result in representing the reflection image of a line length which is enlarged as compared with the measuring section under consideration. In the latter case will appear a given overlapping between the partial reflection images of two successive lines.

As will be explained more in detail in the following description, the mere switching over of the individual partial reflection images, corresponding to the measuring sections, lengths or ranges, to different lines, according to the invention, can already be equivalent to a stagewise adjustment of the equalizing means. Reference is in this connection made to measuring arrangements wherein an impulse equalizing with the aid of switched-in distortion correction members, is for reasons of simplification avoided, a corresponding compensation of the impulse distortions being effected, in the evaluation of the reflection image, by the use of calibration curves or tables in which the line attenuation is considered. Upon using thereby for each individual line of the subdivided reflection image, a separate calibration curve or table, in the sense of a fixedly adjusted equalizing means, the adjustment proper of the distortion correction means will reside in the allocation of the partial reflection image to one of the respective lines. In the illustrated embodiment, the control of the generator 17, which determines the respective line, by the synchronization impulses produced at 15, can be considered as a stage-wise control of an equalizing means, insofar as an individual calibration curve or table is used for each line, and since the amplitude of the voltage produced at 17 already represents a definite criterion as to the calibration curve which is to be used for the evaluation of the corresponding partial reflection image.

A cathode ray oscilloscope 18 serves for the purely optical indication of the reflection image, to such oscilloscope being conducted the stroboscopic time deflection voltages from 14, also the output voltage from the low frequency amplifier 9 and the stepped voltage from the generator 17. It is thereby advisable to use a picture screen with strong afterglow or to somewhat increase, for the distinct representation at the cathode ray oscilloscope, the sequence frequency of the impulse generator 15 as compared with the sequence frequency required for the mere recording of the two-coordinaate recorder 10.

Numeral 19 indicates a direct voltage generator which produces a voltage with adjustable amplitude. This voltage is conducted to an input of a voltage comparison circuit (comparator) 20, the other input of which is supplied with the sawtooth voltage produced at 12. Assuming that the two voltages have the same amplitude, there will appear an output impulse in 20, which causes the serially disposed impulse generator 21 to release a pin impulse. The pin impulses produced in this manner lie, with unaltered adjustment of the delay circuit 11, within each period of the test impulse voltage at the same point, so that a definite point of the reflection image can be indicated thereby. In the event of an amplitude change at the direct voltage generator 19, such point will correspondingly shift within the period. For the marking of this point, which may, with appropriate calibration of the direct voltage generator 19, serve as a shiftable or distance mark for the accurate determination of the location of individual faults on the line, the pin impulses are over a line 22 extended either to the vertical deflection device of the two-coordinate recorder 10, thereby producing a deflection which is recognizable in the form of a vertical line, or the pin impulses are extended to the intensity control electrode of the oscilloscope 18, whereby the point of the reflection image which is to be marked, is scanned as to brightness or darkness. The time and distance markings, respectively, are inserted into the reflection image with great clarity and sharpness, owing to the relatively slow time deflection speed in the evaluation devices 10 and 18, respectively, thus enabling an exact reading.

Changes may be made within the scope and spirit of the appended claims which define what is believed to be new and desired to have protected by Letters Patent.

I claim:

1. Apparatus for use with an electrical transmission line under test, for testing impedance irregularities therein, comprising a source of controlling impulses, means for generating test impulses at a given rate for application to said transmission line, said controlling impulses being synchronized with said test impulses, a cathode ray oscilloscope having a control grid, horizontal and vertical deflection means for visually indicating the results of the test, means for generating a stroboscopic time deflection voltage for said horizontal deflection means, circuit means connected to said transmission line between said test impulse generator and said oscilloscope connecting the line and the vertical deflection means of said oscilloscope including time-controllable equalizing means for equalizing the distortion of said test impulses, further including a sampling gate, and still further including a band pass filter, the input of said band pass filter being connected to the output of said sampling gate, a sawtooth generator for producing a sawtooth voltage, said sawtooth voltage being synchronized with said controlling impulses, a comparator connected with said means for generating said stroboscopic voltage and with said sawtooth generator, circuit means connecting the output of said comparator with said sampling gate, and circuit means connecting said means for generating said stroboscopic voltage with said time-controllable equalizing means, said stroboscopic voltage serving as a time-control voltage for said equalizing means.

2. Apparatus according to claim 1, wherein said time-controllable equalizing means comprises an amplifier which is continuously adjustable as to its gain-frequency characteristic.

3. Apparatus according to claim 1, wherein said time-controllable equalizing means comprises an attenutation quadrupole which is continuously adjustable as to its frequency response.

4. Apparatus for use with an electrical transmission line under test, for testing impedance irregularities therein, comprising a source of controlling impulses, means for generating test impulses at a given rate for application to said transmission line, said controlling impulses being synchronized with said test impulses, a cathode ray oscilloscope having a control grid, horizontal and vertical deflection means for visually indicating the results of the test, means for generating a stroboscopic time deflection voltage for said horizontal deflection means, circuit means connected to said transmission line between said test impulse generator and said oscilloscope connecting the line and the vertical deflection means of said oscilloscope including time-controllable equalizing means for equalizing the distortion of said test impulses, further including a sampling gate, and still further including a band pass filter, the input of said band pass filter being connected to the output of said sampling gate, a sawtooth generator for producing a sawtooth voltage, said sawtooh voltatge being synchronized with said controlling impulses, a comparator connected with said means for generating said stroboscopic voltage and with said sawtooth generator, circuit means connecting the output of said comparator with said sampling gate, circuit means connecting said means for generating said stroboscopic voltage with said time-controllable equalizing means, means for generating an impulse voltage connected to said means for generating said stroboscopic voltage, said impulse voltage being synchronized with said stroboscopic voltage, and circiut means connecting said means for generating said impulse voltage with said equalizing means, said impulse voltage serving as time-control voltage for said equalizing means.

5. Apparatus according to claim 4, wherein said time-controllable equalizing means are adjustable in stages, comprising circuit means connecting said source of controlling impulses with said sawtooth generator, including means for producing an adjustable phase-shift between said controlling impulses and said sawtooth voltage in corresponding stages, means for controlling said cathode ray oscilloscope with respect to different horizontal lines of the visual indication of the test results, and circuit means for utilizing said impulse voltage as a control voltage for simultaneously adjusting said adjustable means for producing said phase-shift, and said means for switching said cathode ray oscilloscope as well as said time-controllable equalizing means.

6. Apparatus according to claim 4, comprising in further combination a direct voltage generator for producing a direct voltage with an adjustable amplitude, a further comparator connected with said sawtooth generator and said direct voltage generator, circuit means connecting the output of said comparator with said vertical deflection means of said cathode ray oscilloscope, an output impulse of said comparator appearing at the time of amplitude identity between said sawtooth voltage and said direct voltage serving as a marker impulse for marking a given point of said visual indication of the test results.

7. Apparatus according to claim 4, wherein said time-controllable equalizing means comprises an amplifier which is in stages adjustable to its gain-frequency characteristics.

8. Apparatus according to claim 4, wherein said time-controllable equalizing means comprises an attenuation quadrupole which is in stages adjustable as to its frequency response.

9. Apparatus according to claim 4, comprising a two-coordinate recorder having horizontal and vertical deflection means, said deflection means of said recorder being connected in parallel relationship to said deflection means of said cathode ray oscilloscope.

10. Apparatus for use with an electrical transmission line under test, for testing impedance irregularities therein, comprising a source of controlling impulses, means for generating test impulses at a given rate for application to said transmission line, said controlling impulses being synchronized with said test impulses, a two-coordinate recorder having horizontal and vertical deflection means for visually indicating the results of the test, means for generating a stroboscopic time deflection voltage for said horizontal deflection means, circuit means connected to said transmission line between said test impulse generator and said recorder connecting the line and the vertical deflection means of said recorder including time-controllable equalizing means for equalizing the distortion of said test impulses, further including a sampling gate, and still further including a band pass filter, the input of said band pass filter being connected to the output of said sampling gate, a sawtooth generator for producing a sawtooth voltage, said sawtooth voltage being synchronized with said controllable impulses, a comparator connected with said means for generating said stroboscopic voltage and with said sawtooth generator, circuit means connecting the output of said comparator with said sampling gate, circuit means connecting said means for generating said stroboscopic voltage with said time-controllable equalizing means, means for generating an impulse voltage connected to said means for generating said stroboscopic voltage, said impulse voltage being synchronized with said stroboscopic voltage, and circuit means connecting said means for generating said impulse voltage with said equalizing means, said impulse voltage serving as a time-control voltage for said equalizing means.

References Cited by the Examiner
UNITED STATES PATENTS
2,477,023    7/1949    Weaver _____ 324—57

WALTER L. CARLSON, *Primary Examiner.*
E. E. KUBASIEWICZ, *Assistant Examiner.*